United States Patent [19]

Taylor

[11] 4,284,192
[45] Aug. 18, 1981

[54] CHAIN CONVEYORS HAVING MEANS FOR CONTROLLING CHAIN TENSION
[75] Inventor: David B. Taylor, Worcester, England
[73] Assignee: Dowty Meco Limited, Worcester, England
[21] Appl. No.: 95,938
[22] Filed: Nov. 20, 1979
[30] Foreign Application Priority Data
Nov. 21, 1978 [GB] United Kingdom ............... 45483/78
[51] Int. Cl.³ ............................................ B65G 23/44
[52] U.S. Cl. .................................... 198/813; 91/364; 474/109
[58] Field of Search ................ 198/813, 856, 814–816; 91/364; 474/109

[56] References Cited
U.S. PATENT DOCUMENTS
4,007,826  2/1977  Brown et al. ........................ 198/813

Primary Examiner—Robert B. Reeves
Assistant Examiner—Douglas D. Watts
Attorney, Agent, or Firm—Young & Thompson

[57] ABSTRACT

This invention relates to a chain conveyor wherein the tension of the chain or chains thereof is controlled by a closed-loop servo system. The servo-system includes an electrically-operable servo-device. An electrical signal dependent on the torque of an electric motor driving the conveyor is applied to the servo-device for operation thereof to control a piston-and-cylinder device which is adapted to alter the distance between a chain-driving sprocket and another sprocket of the conveyor. The arrangement controls the tension of the or each chain at the point where the chain is just leaving the circumference of the first-mentioned sprocket, maintaining the tension at a constant value which may be near to zero under all conditions of operation.

8 Claims, 1 Drawing Figure

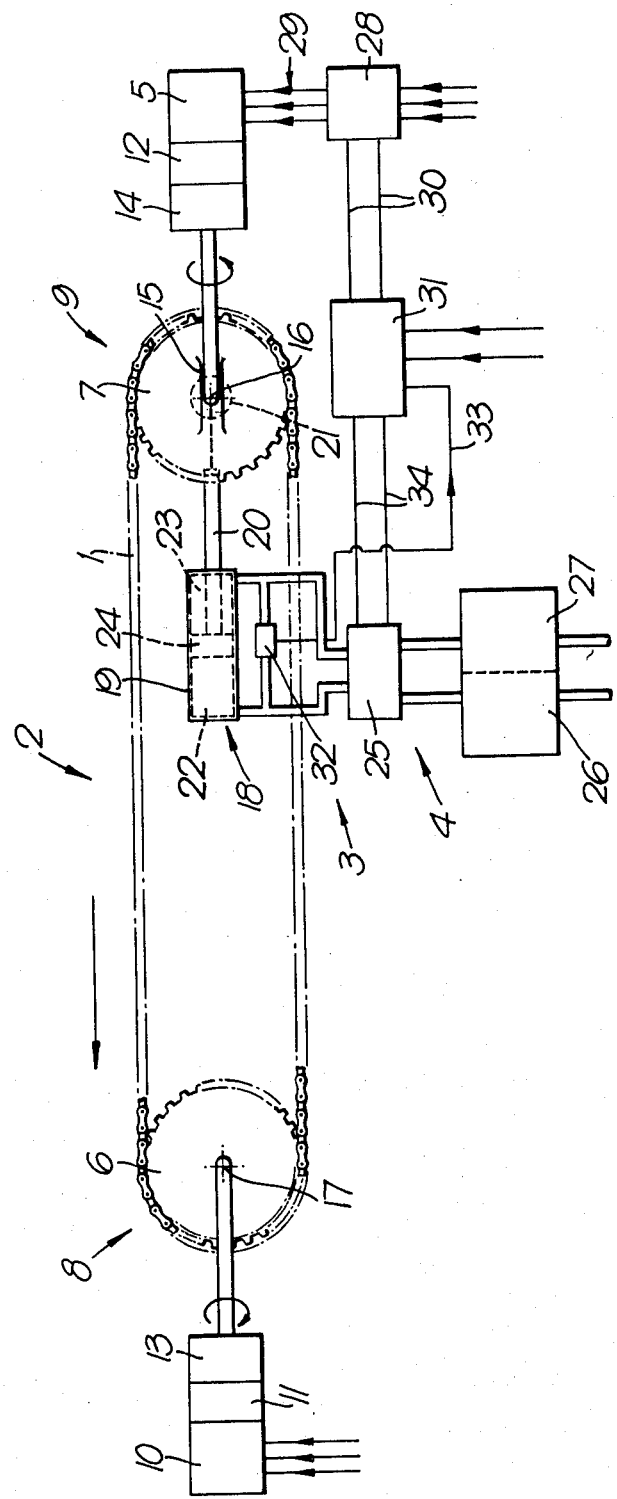

CHAIN CONVEYORS HAVING MEANS FOR CONTROLLING CHAIN TENSION

This invention relates to chain conveyors such as, for example, scraper-chain conveyors having means for controlling chain tension.

In such conveyors it is desirable for the tension of the or each chain thereof, at the point where the chain is just leaving its associated sprocket at the so called tail-end of the conveyor, to be controlled at a constant value. In the past means for controlling conveyor chain tension have been found to cause undesirable wear of certain components of the conveyor when the conveyor is only partly-loaded with material being conveyed.

The invention as claimed is intended to provide a remedy. It solves the problem of how to design a means which so controls the tension of a chain or chains that such undesirable wear is substantially reduced.

According to the invention the tension of the chain or chains of a chain conveyor is controlled by a closed-loop servo-system which includes an electrically-operable servo-device and to which is applied an electrical signal dependent upon the torque of an electric motor driving the conveyor.

The feedback signal of the closed-loop system may be of any suitable kind, for example, an electrical signal.

The closed-loop system may include a fluid-pressure-operable piston-and-cylinder device which is so connected to a driving sprocket of the conveyor, driven by said electric motor, that it can alter the distance between the driving sprocket and another sprocket of the conveyor. When a piston-and-cylinder device is so employed, the feedback signal can be an electrical signal derived from a transducer which senses fluid pressure in the piston-and-cylinder device.

The advantages offered by the invention are mainly that the tension in the chain or chains is more accurately controlled at the desired constant value and, as a result, conveyor component wear is substantially reduced.

One embodiment of the invention will now be described by way of example with reference to the accompanying diagrammatic drawing which shows a chain conveyor, together with its driving motors, and an associated servo-system for controlling the tension in the chain of the conveyor.

In the construction shown in the drawing the tension of the chain or chains 1 of a scraper-chain conveyor 2 is controlled by a closed-loop servo-system 3 which includes an electrically-operable servo-device 4 and to which is applied an electrical signal dependent upon the torque of an electric driving motor 5.

The or each chain 1 extends between and passes around part of the circumferences of two spaced-apart sprockets 6 and 7. The sprocket 6 is at the so-called head-end 8 of the conveyor and the other sprocket 7 is at the so-called tail-end 9 of the conveyor.

The sprocket 6 is driven by an electric motor 10 and the sprocket 7 is driven by the electric motor 5. The electric motors 10 and 5 are connected to their sprockets 6 and 7 by way of respective fluid couplings 11, 12 and respective gear-boxes 13, 14.

It is desirable that the tension of the or each chain 1, at the point where the chain is just leaving the circumference of the tail-end sprocket 7, be maintained at a constant value, preferably a small value which may, for example, be near to zero under all conditions of operation. For that purpose, the tail-end sprocket 7 is suitably mounted in guides 15 so that its axis 16 of rotation can be moved nearer to or further away from the axis 17 of rotation of the head-end sprocket 6.

Movement of the tail-end sprocket 7 is effected by a piston-and-cylinder device 18, the cylinder 19 of which in this particular embodiment is fixed in position and the piston rod 20 suitably connected to the mounting 21 for the tail-end sprocket.

The two chambers 22, 23 of the cylinder 19, that is to say those separated by a piston 24 affixed to the piston rod 20, are connected to an electro-hydraulic servo-valve 25.

The servo-valve 25 is connected to a suitable source 26 of liquid under pressure and to a low-pressure source 27. When actuated the servo-valve will cause liquid under pressure to flow to one or other of the chambers 22, 23 of the device 18, and liquid to flow from the said other chamber or said one chamber, as the case may be, to the low-pressure source. This will cause the piston 24 and hence the piston rod 20 to move to adjust the distance between the rotational axes 16 and 17 of the sprockets 7 and 6.

Actuation of the servo-valve 25 is effected by an electrical signal. A device 28, in the form of an electrical-transformer, is connected in the electrical circuit 29 of the electric motor 5 driving the tail-end sprocket 7. This device provides an output current signal which is dependent upon the torque of the motor 5 at any instant. The output current signal is fed by way of conductors 30 to an amplifier/control unit 31. Also, an electrical feedback signal, which is derived from a transducer 32 so as to be dependent on the pressure differential prevailing in the piston-and-cylinder device 18, is fed by way of a conductor 33 to the unit 31.

In the unit 31, the two electrical signals are compared and the resultant, if any, is fed by conductors 34 to the electrical circuit of the servo-valve 25.

When the tension of the or each chain 1, at the point where the chain is just leaving the circumference of the tail-end sprocket 7, is at its desired value, the servo-valve 25 will be in its so-called "null" position in which no liquid under pressure will be supplied to either one of the two chambers 22, 23 of the device 18, but pressure subsisting in the chambers will be held. Should the tension vary from the desired value, the unit 31 will feed an electrical output signal to the servo-valve 25, and liquid under pressure will be fed to one or other chamber 22, 23 of the device 18 until the rotational axis 16 of the tail-end sprocket 7 has moved such a distance as to restore the tension to its desired value. At this instant the two electrical signals fed to the unit 31 will be such that the servo-valve 25 takes up its "null" position.

In this way during all conditions of operation the load on the motor 5 is continuously monitored and automatic adjustment of the tension in the chain or chains 1 accordingly so effected by the servo-valve 25 when necessary as to maintain the desired and low tension in the chain at the point where the chain is just leaving the circumference of the sprocket 7.

Although in the embodiment above-described with reference to the drawing the electrical feedback signal is derived from a transducer 32, in alternative embodiments of the invention the feedback signal may be derived from a potentiometer in a manner such that it is dependent on the position of the piston 24 with respect to the cylinder 19.

Although in the embodiment above-described with reference to the drawing liquid under pressure is delivered to one or other of the chambers 22 and 23 of the piston-and-cylinder device 18 in dependence on the controlling effect of the servo-valve 25, in alternative embodiments of the invention the piston-and-cylinder device and the valve 25 may be such that during operation a constant liquid pressure is continually applied in the chamber 23 while the pressure in the chamber 22 is controlled by the operation of the valve 25. In this case the transducer 32 will only measure the pressure in the chamber 22 and not the pressure differential prevailing in the device 18.

I claim:

1. A chain conveyor including a driving sprocket, an electric motor arranged to drive that sprocket, another sprocket spaced from said driving sprocket, an endless chain extending between and meshing with the two sprockets so as to form upper and lower chain runs, a fluid-pressure-operable device which is so connected to said driving sprocket, and the driving sprocket being so adjustably mounted, that said device is capable of altering the distance between the driving sprocket and said other sprocket to effect adjustment in the tension of the chain, and a servo-system, of which said fluid-pressure-operable device forms a part, which includes an electrically-operable servo-device for controlling said fluid-pressure-operable device, feedback means connected between said fluid-pressure-operable device and the input side of said servo-system, and means for applying to said servo-device an electrical signal which is dependent upon the torque, at any instant, of said electric motor whereby the load on the motor is, during operation of the conveyor, continuously monitored and, in response to said signal, said servo-device can cause said fluid-pressure-operable device to effect adjustments in said distance between said driving sprocket and said other sprocket sufficient for the tension in the chain, at a point where the chain is just leaving the circumference of said driving sprocket, to be maintained at a predetermined and low value.

2. A conveyor as claimed in claim 1, wherein the feedback signal from said feedback means comprises an electrical signal which is derived from a transducer which senses fluid pressure in said fluid pressure-operable device.

3. A conveyor as claimed in claim 2, wherein said fluid-pressure-operable device comprises a piston-and-cylinder device.

4. A conveyor as claimed in claim 3, wherein said driving sprocket is mounted in guides to enable it to be moved by said piston-and-cylinder device nearer to or further away from the other sprocket.

5. A conveyor as claimed in claim 1, wherein said driving sprocket and said other sprocket are driven through the intermediary of respective fluid couplings and respective gear-boxes.

6. A conveyor as claimed in claim 1, wherein said servo-device comprises an electro-hydraulic servo-valve connected to a suitable source of liquid under pressure and to a low-pressure source.

7. A conveyor as claimed in claim 6, wherein said electrical signal applied to said servo-valve passes thereto by way of an amplifier/control unit.

8. A conveyor as claimed in claim 7, wherein said amplifier/control unit is connected to receive both said electrical signal dependent upon the torque of said electric motor driving the conveyor and an electrical feedback signal from said feedback means, said unit being adapted to compare said signals and the signal conducted to said electro-hydraulic servo-valve being the resultant of that comparison.

* * * * *